(12) United States Patent
Kipnes

(10) Patent No.: US 8,209,873 B1
(45) Date of Patent: Jul. 3, 2012

(54) ADAPTIVE BASE FOR SCREW THREAD MEASURING APPARATUS

(76) Inventor: Hyman Jack Kipnes, Hauppauge, NY (US)

(*) Notice: Subject to any disclaimer, the term of this patent is extended or adjusted under 35 U.S.C. 154(b) by 0 days.

(21) Appl. No.: 13/373,521

(22) Filed: Nov. 17, 2011

(51) Int. Cl.
*G01B 5/16* (2006.01)
*G01B 3/40* (2006.01)

(52) U.S. Cl. .................. 33/199 R; 33/199 B; 33/829

(58) Field of Classification Search .............. 33/119 R, 33/119 B, 815, 828, 829, 831, 572
See application file for complete search history.

(56) References Cited

U.S. PATENT DOCUMENTS

| | | | |
|---|---|---|---|
| 2,906,029 A * | 9/1959 | Croshier et al. | 33/829 |
| 2,939,220 A * | 6/1960 | Croshier et al. | 33/829 |
| 3,496,758 A * | 2/1970 | Sunnen | 33/821 |
| 4,110,221 A | 8/1978 | Moser | |
| 4,221,635 A | 9/1980 | Kurtz et al. | |
| 4,339,064 A | 7/1982 | Ziaylek, Jr. | |
| 4,678,381 A | 7/1987 | Bailey | |
| 4,821,422 A * | 4/1989 | Porter | 33/199 R |
| 4,842,397 A | 6/1989 | Eisler | |
| 4,893,533 A | 1/1990 | Harris | |
| 4,894,979 A | 1/1990 | Lohrentz | |
| 4,947,555 A * | 8/1990 | Allen, III | 33/199 R |
| 5,108,080 A | 4/1992 | James | |
| 5,120,967 A | 6/1992 | Cappelli | |
| 5,317,809 A | 6/1994 | Kipnes | |
| 5,353,516 A * | 10/1994 | Dalton | 33/821 |
| 6,164,391 A | 12/2000 | Wurm | |
| 6,206,060 B1 | 3/2001 | Blake | |
| 6,449,867 B1 * | 9/2002 | Scott | 33/832 |
| 6,879,389 B2 | 4/2005 | Meyer et al. | |

* cited by examiner

Primary Examiner — R. A. Smith
(74) Attorney, Agent, or Firm — Alfred M. Walker

(57) ABSTRACT

A size adaptive base for holding micrometers used in measuring screw threads modifies the vice jaw section of the base pedestal unit of the thread measuring apparatus to accommodate a variety of micrometer sizes. The pedestal includes a two-part vice with separate jaw. The resting ledge for the micrometer frame edge is placed on the pedestal to accommodate a 2"-3" micrometer, the largest of the three sizes. The jaw with clamping screw locks the micrometer at the proper angle and position with the anvil over the well center. For the two smaller micrometers, an insert spacer is used between the pedestal ledge and the edge of the micrometer frame to lift up these smaller instruments at the proper position with the anvil at the well center. The same separate locking jaw is sized to accommodate all three sizes of micrometer.

9 Claims, 5 Drawing Sheets

2" - 3" Micrometer

1" - 2" Micrometer

0 - 1" Micrometer

US 8,209,873 B1

ADAPTIVE BASE FOR SCREW THREAD MEASURING APPARATUS

FIELD OF THE INVENTION

The present invention relates to a size adaptive base for holding micrometers used in measuring screw threads.

BACKGROUND OF THE INVENTION

The present inventor had an earlier patent, namely U.S. Pat. No. 5,317,809 for a screw thread measuring apparatus. The invention used a micrometer to make the actual measurements using the 3-wire method. The base and pedestal of the apparatus were sized to accept a single micrometer size, although users may have several sizes.

OBJECTS OF THE INVENTION

It is therefore an object of the present invention to provide a size adaptive base for holding micrometers used in measuring screw threads.

It is also an object of the present invention to provide an adaptive base which can be used to hold micrometers of standard sizes for use is measuring screw threads by the 3 wire method Other objects which become apparent from the following description of the present invention.

SUMMARY OF THE INVENTION

In keeping with these objects and others which may become apparent, the present invention modifies the vice jaw section of the base pedestal unit of the thread measuring apparatus to accommodate a variety of micrometer sizes. For the purpose of this invention, the adaptation to accept 0-1", 1"-2", and 2"-3" micrometers will be explored via the drawings since these are the three most popular domestic sizes. It will be appreciated that other micrometer sizes, such as those based on the metric system can also be accommodated by similar adaptations.

Applicant's prior U.S. Pat. No. 5,317,809 incorporates an integral vice jaw section of the base pedestal to grasp the micrometer and orient it at the proper angle and location with anvil at the center of a measuring well. In this invention, the pedestal is redesigned to accommodate a two-part vice with separate jaw. The resting ledge for the micrometer frame edge is placed on the pedestal to accommodate a 2"-3" micrometer, the largest of the three sizes. The jaw with clamping screw will then lock this micrometer at the proper angle and position with anvil over the well center. For the two smaller micrometers, an appropriately sized insert spacer is used between the pedestal ledge and the edge of the micrometer frame so as to lift up these smaller instruments so that they too will be at the proper position with anvil at the well center. The same separate locking jaw is sized to accommodate all three sizes of micrometer. The thickness of the insert spacers used is always slightly less than the thickness of the micrometer frame as the locking jaw will bridge both spacer and micrometer, but must exert locking pressure on the micrometer frame.

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION OF THE INVENTION

Figure 1:
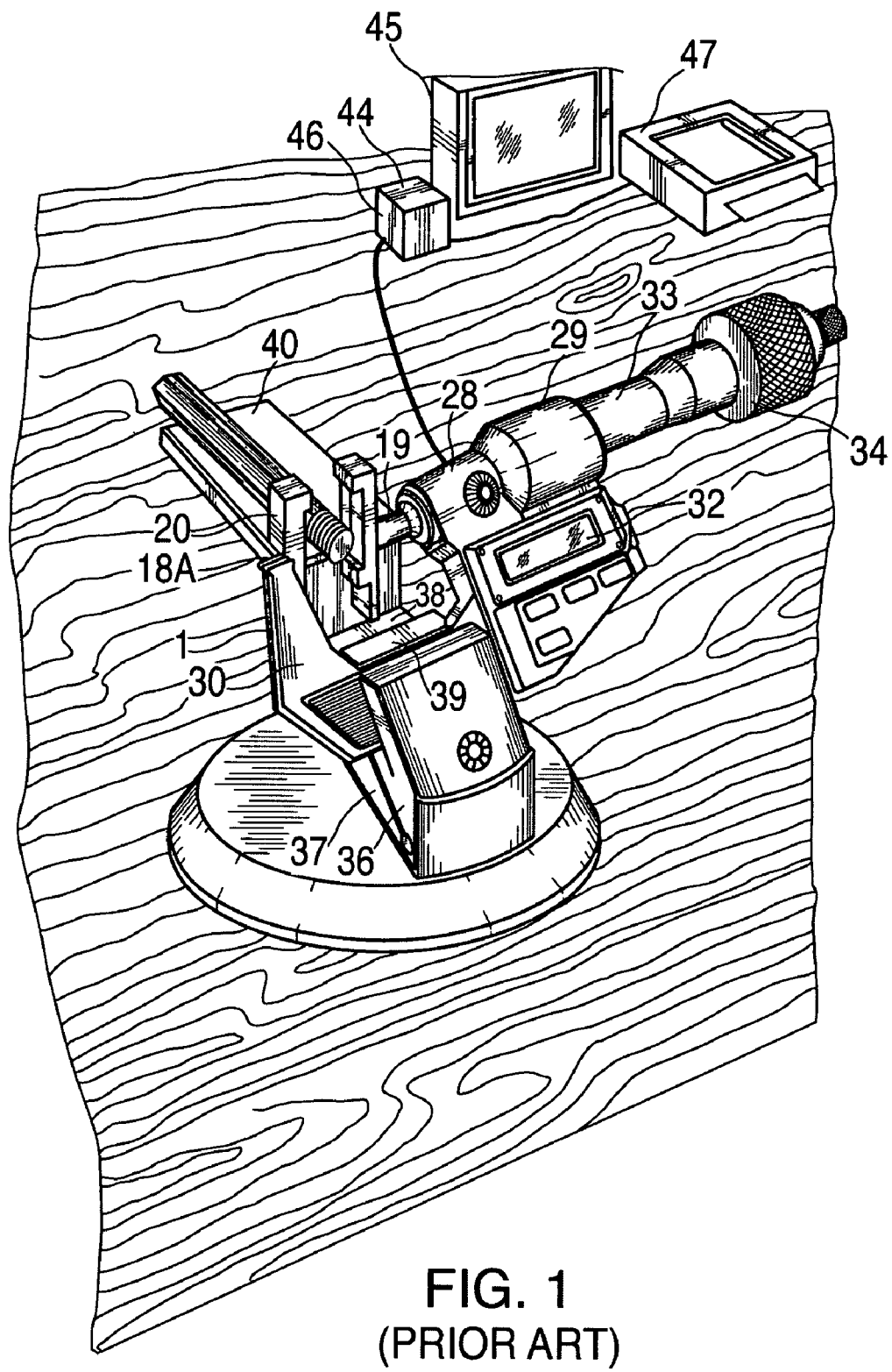
FIG. 1 is a perspective view of the prior-art thread measuring apparatus showing a micrometer in use.
Figure 2:
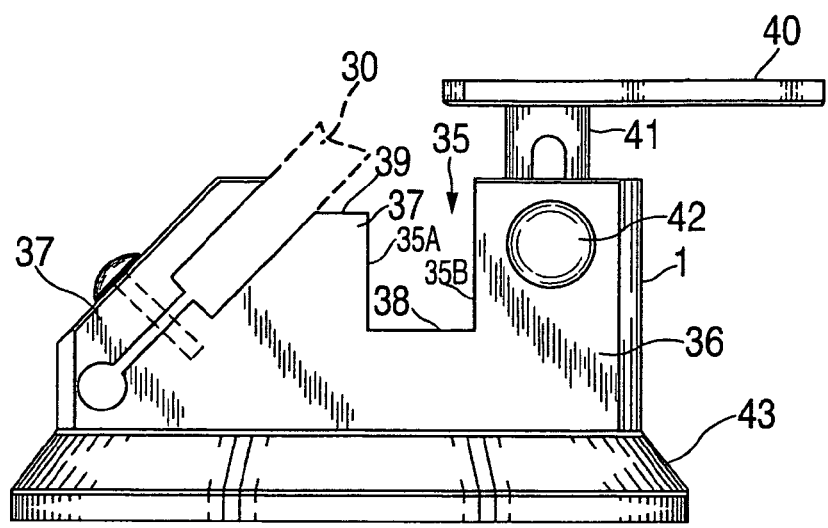
FIG. 2 is a side elevation view of the prior-art base and pedestal with integral vice-jaw section.

FIG. 1 is a prior art drawing of the thread measuring apparatus showing micrometer 30 in integral vice jaw section 37 of pedestal 36. FIG. 2 is a side elevation prior-art drawing showing the clamping method in greater detail. Note the integral spring and clamping jaw 27 formed from pedestal 36 atop round base 43. In the present invention, a separate clamping jaw is used and no element corresponding to the springy attachment is required.

Figure 4:
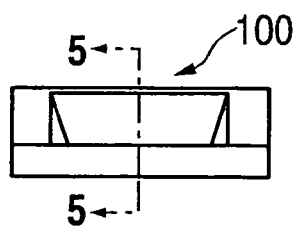
FIG. 4 is a end view of the locking jaw.

As shown in prior art, FIGS. 1 and 2 corresponding to FIGS. 1 and 4 of prior art U.S. Pat. No. 5,317,309 of Kipnes, a wire is held in place vertically against the appropriate flanks of the screw threads on an opposite side of a screw adjacent to wire holder ear 20.

One wire holder ear 20 is held in place against contact 18A of anvil ledge portion 30 of micrometer 29 abutting rear wire holder ear 20.

An opposite wire holder ear is firmly held in place by an engaging spindle portion 19 rotatable within collar portion 28 of micrometer 29, having indicating display member 32 with indicia, by rotational movement of spindle 19 connected to micrometer rod 33, which rod 33 is movable by rotation of handle 34 for tightening of a wire holder ear, disposed to spindle 19, against a screw.

Preferably, the rotation of handle 34 controls a uniform force applied of wires against the screw threads by a torque control built into handle 34.

As also shown in prior art FIGS. 1 and 2, the apparatus includes a pedestal 36, having a generally horizontal ledge portion 39 and further having a vice jaw portion 37, within which micrometer 29 is held in place for measuring the pitch diameter of the screw threads of the screw.

A generally U-shaped recess 35 is indented within pedestal 36, and recess 35 is defined by vertical walls 35A and 35B extending upwardly from horizontal wall 38.

While one wire holder ear 20, is held securely immobile by contact against anvil portion 30 of micrometer 29, the other corresponding oppositely placed wire holder 20, is subject to a spinning movement about rotatable spindle 19 of micrometer 29. Therefore, recess 35 within pedestal 36 is provided to limit rotational movement of wire holder 20.

If rotation of spindle 19 causes the wire holder ear 20 to start to spin, the spinning motion of wire holder ear 20 is interrupted by contact of wire holder ear 20 against vertical wall 35A or 35B within recess 35 of pedestal 36.

Because the wires in wire holder ear 20 are oriented vertically, the screw, with threads being measured, is held horizontally by a holding means, such as upon ledge portion 40 of pedestal 36, which ledge 40 is movable upward by pedestal 41 controlled by tightening member 42 within pedestal 36 of the apparatus. A base, generally circular, designated as reference number 43, is provided to stabilize the holding of the micrometer in place during measurement of the screw threads of the screw.

When the results are tabulated, they are calculated by computer calculator portion 44 disposed to a further display means 45. The input data is transferred from the micrometer 29 via cable 46 to the computer calculator portion 44, which displays the measuring pitch diameter data on display means 45 or prints it on printer 47.

Figure 3:
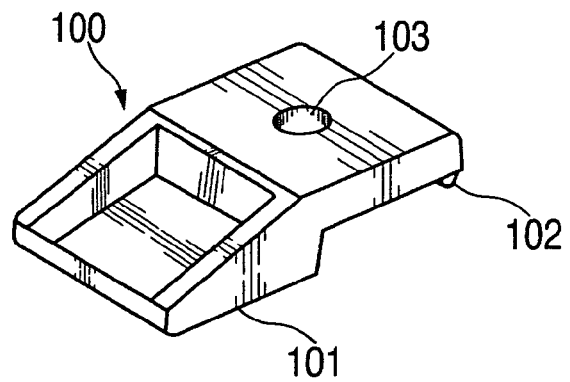
FIG. 3 is a perspective view of the separate locking jaw of this invention.
Figure 5:
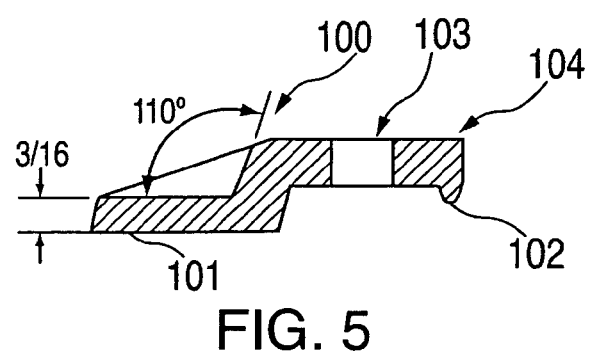
FIG. 5 is a side elevation view in crossection of the locking jaw.

Clamping jaw 100 of the present invention is detailed in FIGS. 3-5. This part is preferably molded of a rigid resin such as glass-filled nylon, acrylonitrile butadiene styrene (ABS) or similar plastics. It can also be made of metal. Note the rocking edge 102, clamping face 101 and clamp screw hole 103 within shoulder 104 of clamping jaw 100.

Figure 6:
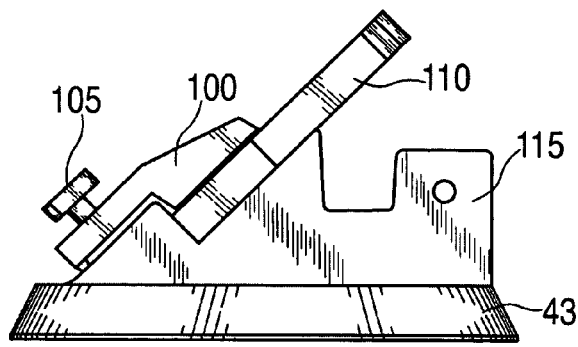
FIG. 6 is a side elevation view of base with pedestal clamping a 2"-3" micrometer.
Figure 7:
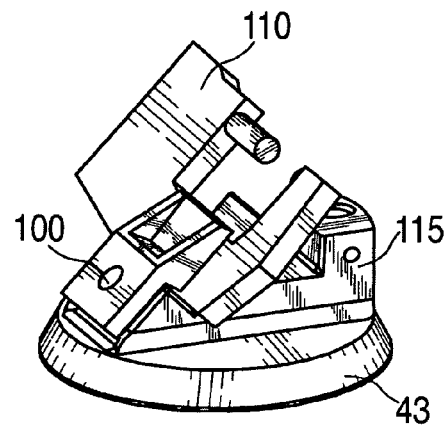
FIG. 7 is perspective view of the clamped micrometer of FIG. 6.

FIGS. 6 and 7 show a 2"-3" micrometer 110 clamped to pedestal 115 by clamp jaw 100. Clamping thumb screw 105 is shown in FIG. 6.

Figure 8:
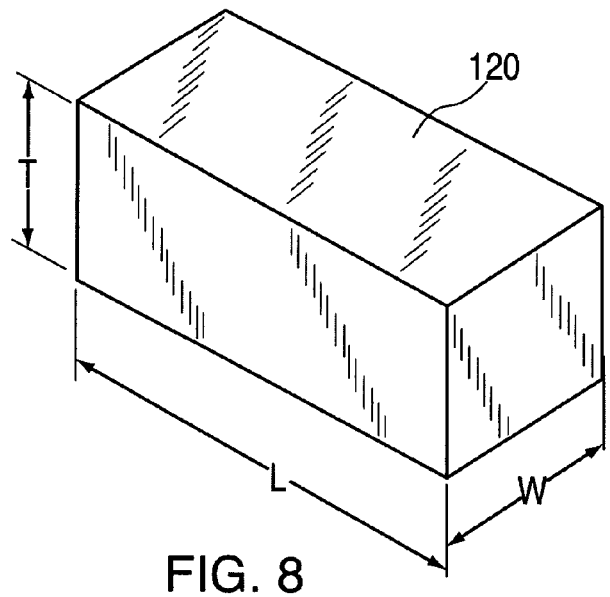
FIG. 8 is a perspective view of a insert spacer of this invention.

FIG. 8 shows an insert spacer 120 for a 1"-2" micrometer with width W, length L, and thickness T annotated. The length matches the width of the pedestal ledge.

Figure 9:
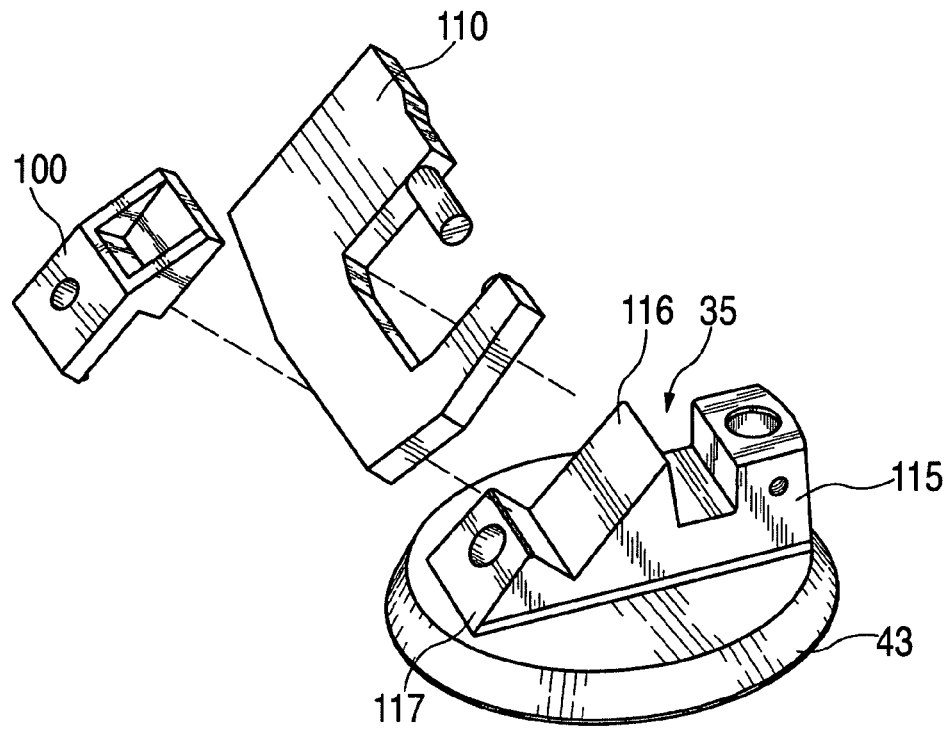
FIG. 9 is a perspective exploded view of the base and pedestal, 2"-3" micrometer, and clamping jaw showing the resting face and micrometer edge ledge of the pedestal.
Figure 10:
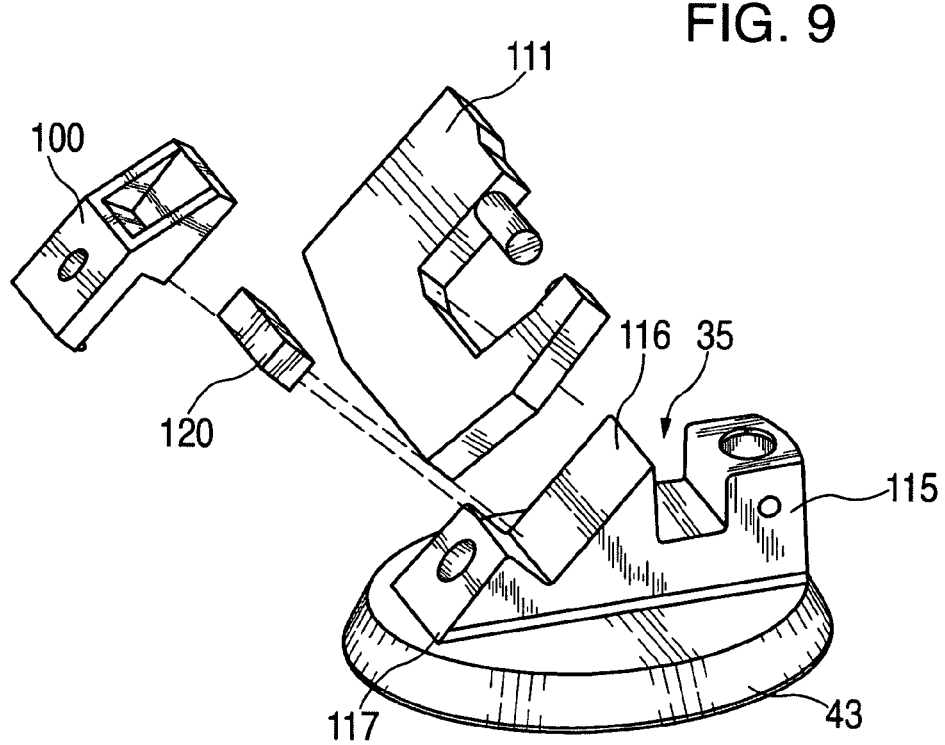
FIG. 10 is a perspective exploded view similar to that of FIG. 9 but to accommodate a 1"-2" micrometer with the addition of an insert spacer placed between the ledge of the pedestal and the edge of the micrometer frame.

FIGS. 9 and 10 are exploded views illustrating the mounting of a 2"-3" micrometer and a 1"-2" micrometer respectively in pedestal 115 with micrometer frame resting face 116 and micrometer edge resting ledge 117. Note further the use of insert spacer 120 in FIG. 10.

Figure 11A:
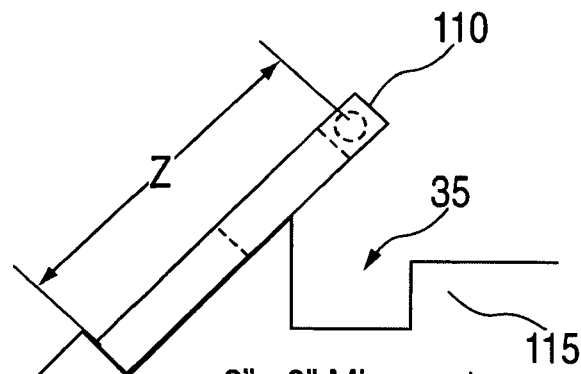
FIGS. 11A, 11B and 11C are schematic side representation views which show the use and size and placement of insert spacers (where needed) to accommodate the three different micrometer sizes at FIGS. 11A, 11B and 11C.
Figure 11B:
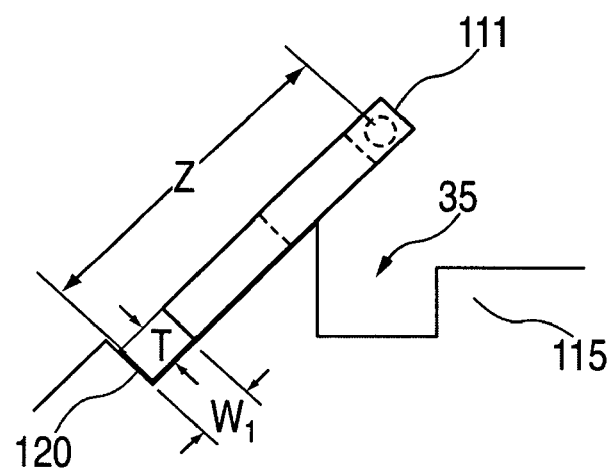
Figure 11C:
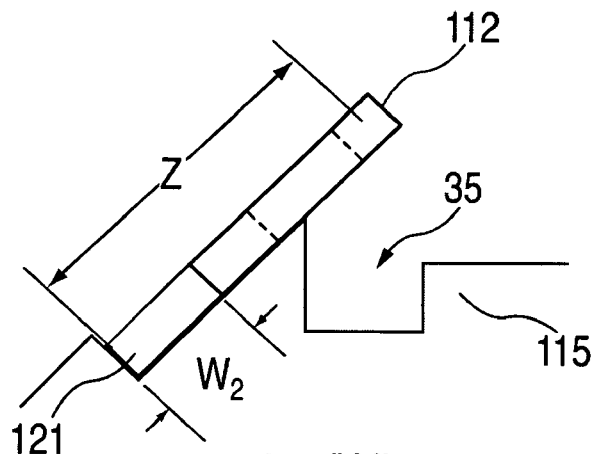

FIGS. 11A, 11B and 11C schematically illustrate the actual placement that is required of the anvil of the micrometer (dashed circle) above the central region of measuring well 35 in pedestal 115.

The 2"-3" micrometer 110 is shown at FIG. 11A. Note that no insert spacer is used here. Dimension Z from the pedestal ledge to the anvil center is that of the micrometer itself.

The 1"-2" micrometer 111 is shown at FIG. 11B. An insert 120 spacer of width W1 is used to make up the deficit of micrometer frame size required to bring the anvil to the proper location of Z away from pedestal ledge.

The 0-1" micrometer 112 is shown at FIG. 11C. An insert 121 of greater width W2 is used to make up the greater deficit of micrometer frame size required to place the anvil a distance Z away from pedestal 115 ledge.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A size adaptive base for holding micrometers used in measuring screw threads using the 3-wire method comprising:

a pedestal base unit;

a vice jaw section on said pedestal base unit of the thread measuring apparatus to accommodate a variety of micrometer sizes;

said vice jaw section including a fixed part on said base pedestal unit and a separate movable jaw portion;

said movable jaw section having a clamping screw locking the micrometer at a predetermined holding angle and position with the anvil over a well center of said base pedestal unit;

a resting ledge for a frame edge of the micrometer located on said pedestal base unit to accommodate a micrometer of a predetermined large size;

at least one insert spacer positionable between said pedestal ledge and an edge of a frame of said micrometer to lift up at least one second micrometer at the proper position with the anvil at the well center.

2. The size adaptive base for holding micrometers as in claim 1 wherein said at least one second micrometer is a plurality of micrometers smaller than said micrometer of said large size, each requiring a respective spacer of a predetermined size to permit each said micrometer of said plurality of micrometers of smaller size to be positioned at the proper position with the anvil at the well center.

3. The size adaptive base for holding micrometers as on claim 1 wherein each said respective thickness of each said spacer is close to but less than the thickness of each respective micrometer frame of said plurality of micrometers of smaller size, so that said locking jaw will bridge both spacer and micrometer, and exerts locking pressure on each respective micrometer frame.

4. The size adaptive base for holding micrometers as in claim 1 wherein said clamping jaw is metal.

5. The size adaptive base for holding micrometers as in claim 1 wherein said clamping jaw is plastic.

6. The size adaptive base for holding micrometers as in claim 1 wherein said clamping jaw is glass filled nylon.

7. The size adaptive base for holding micrometers as in claim 1 wherein said clamping jaw is acrylonitrile butadiene styrene.

8. The size adaptive base for holding micrometers as in claim 1 wherein said movable jaw portion includes a shoulder portion having an aperture accommodating said screw, a rocking edge at an end rear edge of said shoulder portion and a clamping face portion extending from said shoulder portion; said clamping face portion engaging the micrometer positioned within said space between said fixed jaw portion of said pedestal base unit and said movable jaw.

9. A size adaptive base for holding micrometers comprising:

an vice jaw section of a pedestal base unit;

a separate movable clamping jaw having a clamping screw threadable in said pedestal base unit for moving said movable jaw with respect to a thickness of a micrometer frame being held within said size adaptive base;

said movable jaw having a shoulder portion, a rocking edge, a clamping face and a clamp screw hole accommodating said clamping screw therethrough;

at least one insert spacer insertable within a space in said base pedestal unit to make up a predetermined size deficit of a micrometer frame size required to bring the anvil to a predetermined location away from a ledge of said pedestal base unit.

* * * * *